United States Patent
Shekey et al.

(10) Patent No.: US 9,548,042 B2
(45) Date of Patent: Jan. 17, 2017

(54) RESPONSIVE DOCUMENT BREAKPOINTS SYSTEMS AND METHODS

(75) Inventors: Aaron Shekey, San Francisco, CA (US); Robert Walton, San Francisco, CA (US); Tara Feener, San Francisco, CA (US); Jacob Surber, Foster City, CA (US); Kristofer Joseph, Emeryville, CA (US)

(73) Assignee: Adobe Systems Incorporated, San Jose, CA (US)

(*) Notice: Subject to any disclaimer, the term of this patent is extended or adjusted under 35 U.S.C. 154(b) by 520 days.

(21) Appl. No.: 13/536,811

(22) Filed: Jun. 28, 2012

(65) Prior Publication Data

US 2014/0006936 A1    Jan. 2, 2014

(51) Int. Cl.
*G09G 5/00* (2006.01)
*G09G 5/14* (2006.01)

(52) U.S. Cl.
CPC ............ *G09G 5/14* (2013.01); *G09G 2340/14* (2013.01); *G09G 2354/00* (2013.01)

(58) Field of Classification Search
CPC ..................................................... G06F 3/14
USPC ......................................... 715/252, 243, 238
See application file for complete search history.

(56) References Cited

U.S. PATENT DOCUMENTS

| | | | |
|---|---|---|---|
| 7,703,041 B2* | 4/2010 | Ito et al. | 715/804 |
| 7,764,291 B1 | 7/2010 | Wang et al. | |
| 8,005,316 B1 | 8/2011 | Linburn et al. | |
| 8,321,809 B2* | 11/2012 | Eom | 715/792 |
| 8,423,900 B2* | 4/2013 | Fillion et al. | 715/788 |
| 2004/0003350 A1* | 1/2004 | Simmons et al. | 715/517 |
| 2004/0012627 A1* | 1/2004 | Zakharia et al. | 345/744 |
| 2005/0237321 A1* | 10/2005 | Young et al. | 345/418 |
| 2008/0082920 A1* | 4/2008 | Eom | 715/702 |
| 2008/0215966 A1* | 9/2008 | Suarez | 715/252 |
| 2008/0282147 A1* | 11/2008 | Schorr | 715/247 |
| 2008/0288526 A1* | 11/2008 | Agrawal et al. | 707/102 |
| 2011/0035661 A1* | 2/2011 | Balinsky et al. | 715/243 |
| 2011/0181600 A1* | 7/2011 | Danton et al. | 345/441 |
| 2011/0225525 A1* | 9/2011 | Chasman et al. | 715/763 |
| 2012/0131442 A1* | 5/2012 | Grizim et al. | 715/234 |
| 2012/0216107 A1* | 8/2012 | Iwabuchi | 715/231 |
| 2012/0254733 A1* | 10/2012 | Tucovic | 715/243 |
| 2013/0326398 A1* | 12/2013 | Zuverink et al. | 715/784 |

* cited by examiner

*Primary Examiner* — Stephen Hong
*Assistant Examiner* — Marshon Robinson
(74) *Attorney, Agent, or Firm* — Shook, Hardy & Bacon L.L.P.

(57) ABSTRACT

Methods and systems for providing and utilizing responsive document breakpoints are provided. An electronic canvas in a first state is displayed, and an object is displayed on the electronic canvas in a first manner according to the first state. A request to resize the electronic canvas is received, where the request indicates a second state of the electronic canvas. A second manner of displaying the object according to the second state is identified. The electronic canvas in the second state is displayed, which includes displaying the object in the second manner according to the second state.

20 Claims, 9 Drawing Sheets

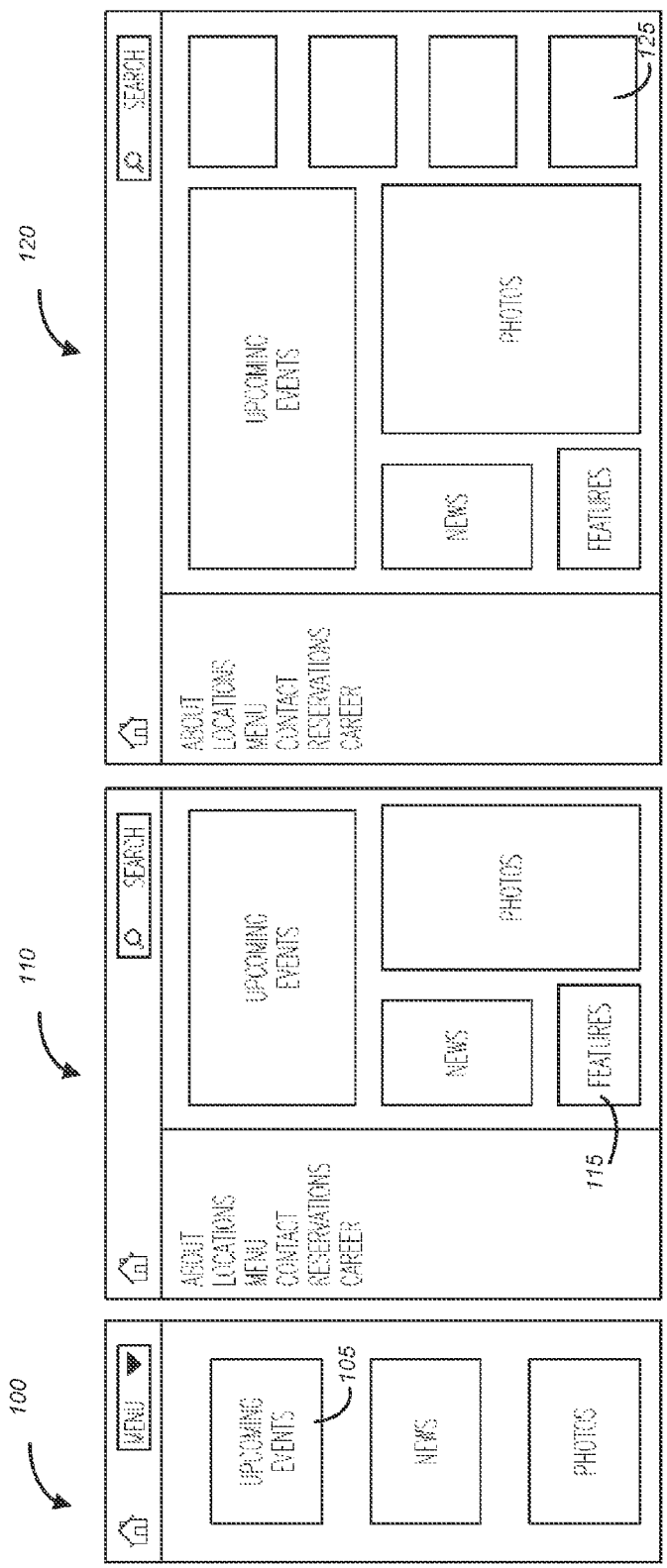

RESPONSIVE DOCUMENT BREAKPOINTS SYSTEMS AND METHODS

TECHNICAL FIELD

This disclosure relates generally to the technical fields of software and/or hardware technology and, in one example embodiment, to responsive document breakpoints systems and methods.

BACKGROUND

The Internet is accessible via a wide variety of computing devices, including laptops, desktops, personal digital assistants (PDAs), mobile phones, and the like. Many of these computing devices allow a webpage to be viewed via a variety of display device types of varying screen sizes and via web browsers of varying window sizes.

To display a webpage on a particular display device, a web designer may design the webpage such that it is properly viewable on that particular display device. For example, a webpage layout may be customized for a laptop with a particular display size. However, that particular webpage layout may not be as easily viewable on a mobile phone. To create a webpage layout that may be more easily viewable on a mobile phone, a designer may create a file for a webpage that has a layout customized for display on a mobile phone and another file for the same webpage that has a different layout customized for display on a laptop.

Similarly, a designer may create webpage layouts for different browser window sizes. For example, a user may view a webpage on a browser window that is maximized to approximately the width and height of the user's display device, where the webpage may have a particular layout when the browser window is maximized. If the user makes the browser window smaller, a designer may create a separate webpage layout for the smaller browser window size such that the webpage is more easily viewable in the browser window.

Although designers have the ability to customize webpage layouts for different display sizes and different browser window sizes, this customization requires a separate file for each webpage layout, which can be time-consuming and inefficient to design and edit. Additionally, when a user changes a browser window size (e.g., makes the window smaller, expands the size of the window, etc.), it may be time consuming to design and edit layouts for the different possible sizes of a browser window since the size of a browser window can be changed by the user to any height and/or width.

BRIEF DESCRIPTION OF DRAWINGS

Embodiments are illustrated by way of example and not limitation in the figures of the accompanying drawings, in which like references indicate similar elements and in which:

FIGS. 1(a)-(c) are interface diagrams illustrating example browser interfaces of varying sizes, in accordance with an example embodiment;

DETAILED DESCRIPTION

Figure 2A:
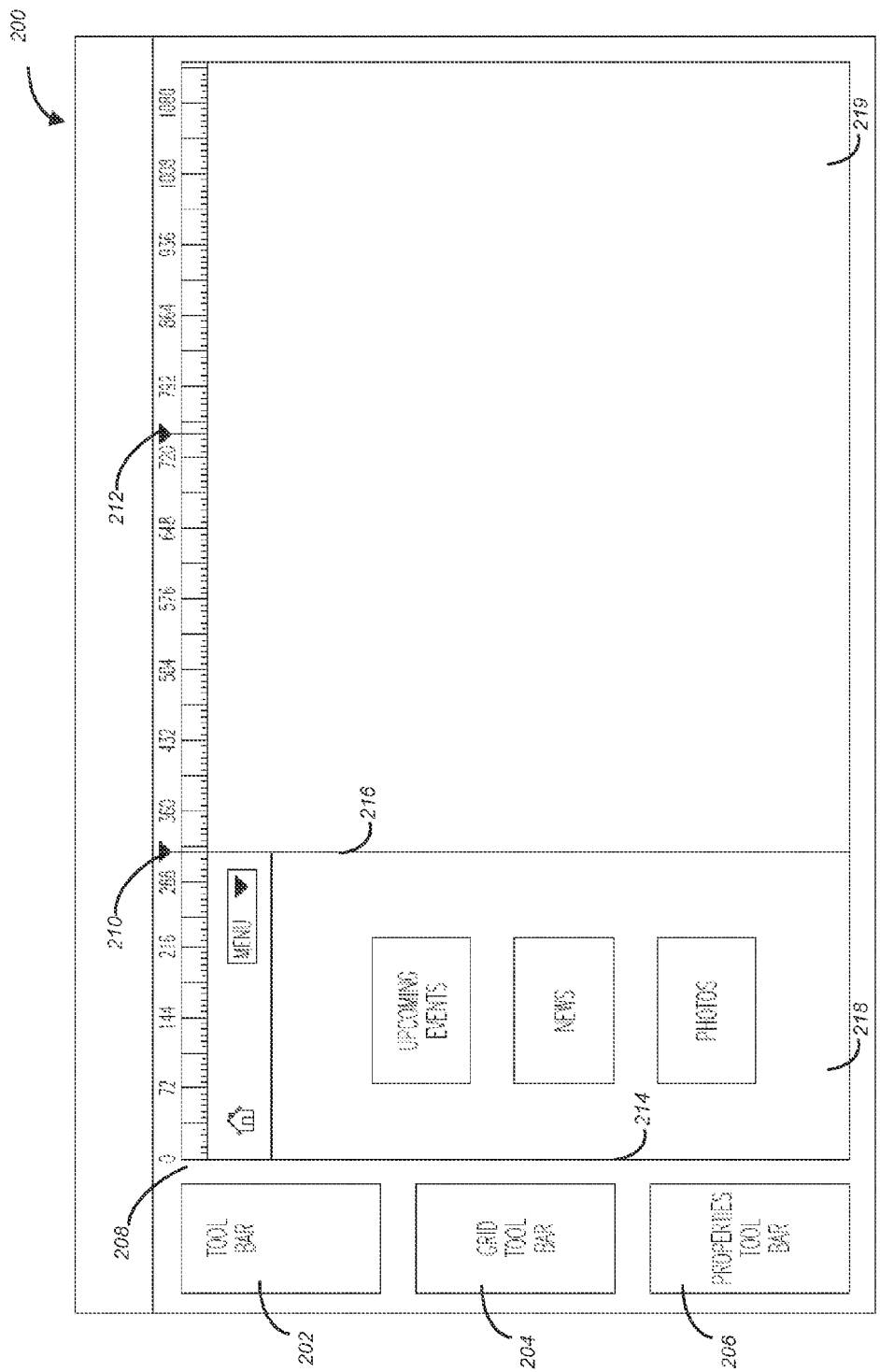
FIGS. 2(a)-(d) are interface diagrams illustrating example user interfaces for designing and editing webpage layouts, in accordance with an example embodiment.
Figure 2B:
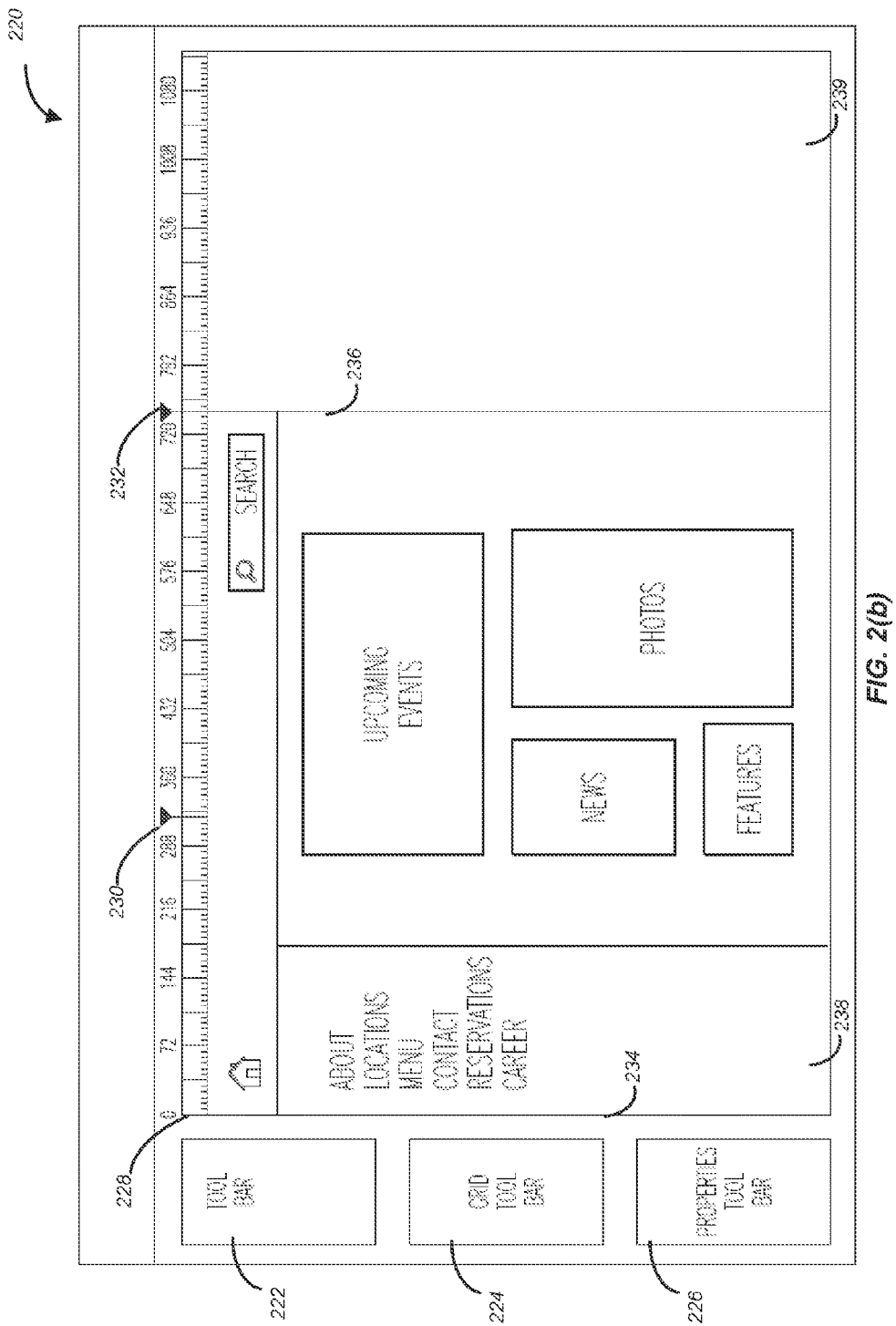
Figure 2C:
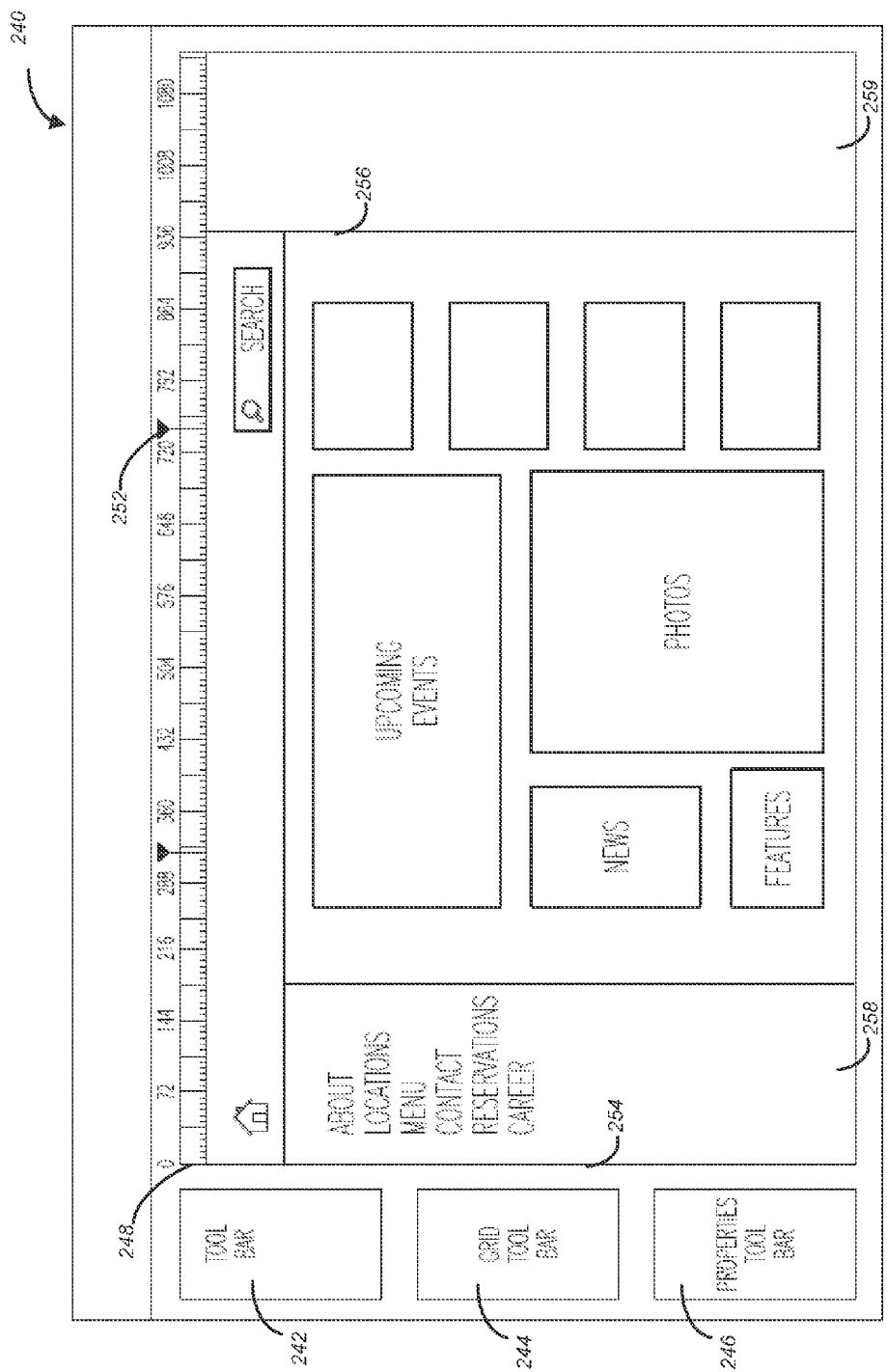
Figure 2D:
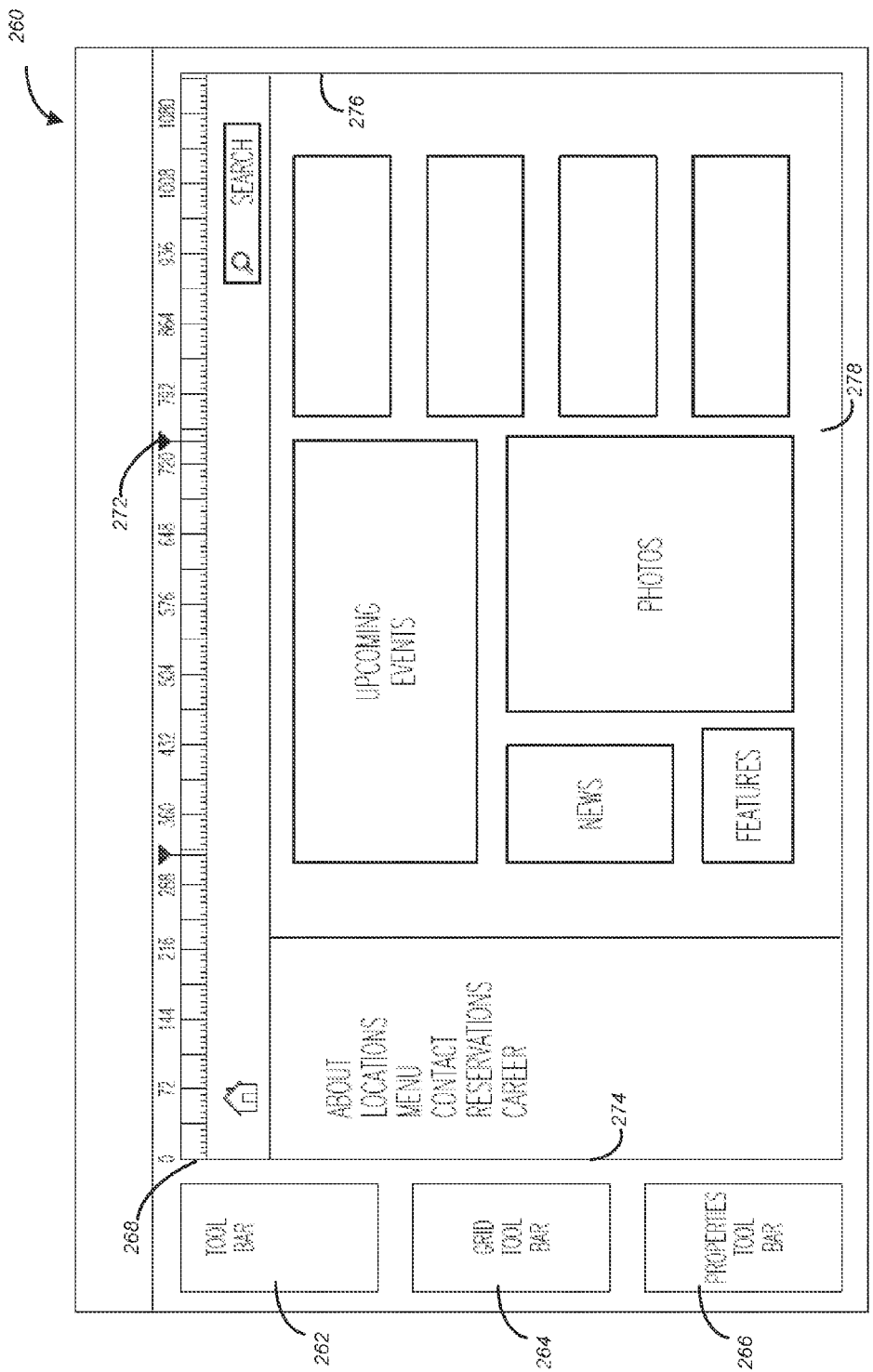

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term "specific apparatus" or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As used herein, a "document" or "an electronic document" refers to electronic media content that is accessible by computer technology. For example, a document can be a file that is not an executable file or a system file and includes data for use by a computer program. An example of a document includes a single or multiple files that are accessible by and/or associated with electronic document processing applications such as word processing applications, document viewers, email applications, presentation applications, spreadsheet applications, diagramming applications, graphic editors, graphic viewers, enterprise applications, web design applications, and other applications. Therefore, as explained in more detail below, a document may be composed of alphanumeric texts, symbols, images, videos, sounds, and other data. It should be appreciated that a document can have a variety of file formats that, for example, may be identified by data within a document and/or by the filename extension. Examples of file formats that may be associated with a document include Adobe Portable Document Format (PDF), Microsoft DOC format, Hypertext Markup Language (HTML) format, Extensible Markup Language (XML) format, Microsoft XLS format, Cascading Style Sheet (CSS) format, Tag Image File Format (TIFF), Rich TextFormat (RTF), Report File Format (RPT), and the like.

Methods and systems are described that provide responsive document breakpoints allowing webpage design for multiple display sizes on a document. The webpage may be designed to be viewable on any display device of any size (e.g., laptops, desktops, PDAs, tablets, mobile phones, etc.) or on any browser window of any size. The responsive document breakpoint features may be provided via a stand-alone software application or may be incorporated into any existing software application. The features may allow a user to design a webpage that may respond to the context of the display (e.g., the browser window size, the display device size).

During the design of a webpage layout, a user may set breakpoints at any location on the document, or the user may utilize default breakpoints set in the document. A breakpoint may be an indicator or marker at a location or position on the electronic document that indicates a particular display size. For example, for a display size of 1024×768 pixels, a breakpoint may be set at a location indicating a 1024 pixel width. The breakpoint at the 1024 pixel width may be used to resize an electronic canvas of the document to that particular display size.

An electronic canvas may be an area on the document on which a web layout may be designed. The size of the electronic canvas may be indicated by boundaries indicating the particular size of the electronic canvas. For example, the electronic canvas may have a boundary at the zero pixel width location and at the 1024 pixel width location, which would allow a user to design a webpage for a display having a 1024 pixel width. The electronic canvas may be the area on which a user may design a layout for a webpage. The electronic canvas may include any objects (e.g., images, text, etc.) that the user wishes to display on the webpage.

The state of the electronic canvas may be dependent upon the size of the electronic canvas and may be associated with a manner in which the electronic canvas is displayed when the electronic canvas is associated with a particular display size. The state of the electronic canvas may be associated with a particular manner in which objects on the electronic canvas are displayed in a particular state. For example, displaying a particular state of an electronic canvas may include displaying an object that has a particular color, font, size, location, animation, behavior, property, and the like when the electronic canvas is in that particular state. A user may set the size of the electronic canvas and may design the layout of objects on the electronic canvas in that state accordingly. The user may also resize the electronic canvas and may change the layout of the objects on the electronic canvas accordingly. For example, the state of an electronic canvas having an 800 pixel width may have objects displayed in a particular manner according to a particular layout chosen by a user for that particular display size. The electronic canvas may have fonts, colors, objects, object locations, object sizes, and the like, that are specific to the state of the electronic canvas with an 800 pixel width. When the state of the electronic canvas is changed (e.g., when the electronic canvas is resized from an 800 pixel width to a 1024 pixel width), the objects on the electronic canvas may be displayed in a different manner according to a different layout chosen by the user for that particular display size. The electronic canvas may have fonts, colors, objects (e.g., fewer or additional objects than those in the 800 pixel-wide electronic canvas), object locations, and the like, that are specific to the state of the electronic canvas with a 1024 pixel width.

The electronic canvas may be resized by the user in any manner. In some embodiments, the user may drag a boundary of the electronic canvas from one pixel width size to another (e.g., from an 800 pixel width to a 1024 pixel width) to resize the electronic canvas. In some embodiments, the user may click a particular breakpoint to resize the electronic canvas to the pixel width indicated by that breakpoint. In some embodiments, the electronic canvas may automatically snap to certain locations when the electronic canvas is dragged close to those locations by the user. For example, a boundary of the electronic canvas may automatically align to locations such as a breakpoint, a line in a grid overlaying the document, and the like.

In some embodiments, if the electronic canvas is being resized by a user, the objects on the electronic canvas may adjust accordingly, and any changes to the layout of those objects with respect to the state of the electronic canvas may be displayed as the electronic canvas is being resized. For example, if a user drags a boundary of an electronic canvas from the 800 pixel width position to the 1024 pixel width position, the changes in the manner in which objects are displayed may be viewed as the electronic canvas is enlarged, and the states of the electronic canvas between those two canvas sizes can be viewed. This may show the user how the layout of a webpage may change as a browser window is enlarged.

FIGS. 1(a)-(c) are interface diagrams illustrating example browser interfaces 100, 110, and 120 of varying sizes. The example browser interfaces 100, 110, and 120 may display a webpage designed on an electronic document using the features associated with responsive document breakpoints. The example browser interface 100 of FIG. 1(a) shows a layout of a webpage that has a particular display size. The webpage may include an object, such as the upcoming events object 105. The manner in which objects on the webpage, such as the upcoming events object 105, are displayed may be specific to the size of the display of the browser interface 100.

The example browser interface 110 of FIG. 1(b) shows a layout of a webpage that has a display size that is larger than the display size of the webpage displayed in the example browser interface 100 of FIG. 1(a). The webpage of FIG. 1(b) may include objects displayed in a particular manner associated with the size of the display of the browser interface 110. For example, the objects may be displayed, sized, and/or arranged in a different manner relative to each other than the manner in which the objects were displayed on a display of a different size. The webpage depicted in the browser interface 110 may also include additional objects, such as the features object 115, that may not have been displayed in the browser interface 100 of FIG. 1(*a*) due to the size of the browser interface 100.

The example browser interface 120 of FIG. 1(*c*) shows a layout of a webpage that has a display size that is larger than the display sizes of the webpages displayed in the example browser interfaces 100 of FIG. 1(*a*) and 110 of FIG. 1(*b*). The webpage of FIG. 1(*c*) may include objects displayed in a particular manner associated with the size of the display of the browser interface 120. For example, the objects may be displayed, sized, and/or arranged in a different manner relative to each other than the manner in which the objects were displayed on a display of a different size. The webpage depicted in the browser interface 120 may also include additional objects, such as the object 125, that may not have been displayed in the browser interfaces 100 of FIG. 1(*a*) or 110 of FIG. 1(*b*) due to the sizes of those browser interfaces 100 and 110.

FIGS. 2(*a*)-(*d*) are interface diagrams illustrating example user interfaces 200, 220, 240, and 260 for designing and editing webpage layouts. The example user interfaces 200, 220, 240, and 260 may be interfaces associated with any software application providing a user with the ability to create, design, and edit a webpage using the responsive document breakpoint features.

The example user interface 200 of FIG. 2(*a*) depicts an electronic document 219 on which webpage layouts may be displayed. The electronic document 219 may include an electronic canvas 218 in a particular state that may be associated with the currently displayed size of the electronic canvas 218. In the example of FIG. 1(*a*), the electronic canvas is in a state associated with the particular width of the electronic canvas 218, which is set at the breakpoint 210. The electronic canvas 218 may be the area on the electronic document 219 on which a web layout may be designed for the particular display size indicated by the boundary 214 and the boundary 216. The electronic canvas 218 includes the layout for the webpage in a user interface similar to that shown in FIG. 1(*a*).

The breakpoints 210 and 212 may be indicators or markers set at particular locations on the electronic document 219 to indicate a particular display size. The display size may be indicated on the ruler 208, which may show pixel width measurements for setting the boundaries of the electronic canvas 218 and placing objects within the electronic canvas 218 at particular locations.

The example user interface 200 may also include tool bar 202, grid tool bar 204, and properties tool bar 206. The tool bar 202 may be a user tool bar having any number of buttons performing any number of functions. Examples of the tool bar 202 may include buttons for functions such as formatting, picture functions, viewing functions, and the like.

The grid tool bar 204 may be a user tool bar having any number of buttons performing any number of functions relating to a grid that can be overlaid on the electronic document 219. For example, the grid tool bar 204 may include buttons relating to turning the grid on or off, adjusting a grid to a particular location or spacing, changing functionalities of the grid, such as the ability to snap objects or the electronic canvas 218 to a line of the grid, and the like.

The properties tool bar 206 may be a user tool bar having any number of buttons performing any number of functions relating to properties or characteristics of objects on the electronic canvas 218 at any particular state. For example, the properties tool bar 206 may indicate the particular colors, fonts, text sizes, and the like that may be associated with objects on the electronic canvas 218 in a particular state. In some embodiments, a breakpoint may be displayed in a particular color, and the properties tool bar 206 may include a color indicator matching the color of the breakpoint and indicating that the current view of the electronic canvas 218 is a view of the state of the electronic canvas 218 when a boundary is aligned with that breakpoint of the same color.

The example user interface 220 of FIG. 2(*b*) depicts the electronic document 239 with an electronic canvas 238 that has been expanded such that the boundary 236 of the electronic canvas 238 is aligned with the breakpoint 232 indicating a larger pixel width than that shown in FIG. 2(*a*). When the electronic canvas 238 is expanded from the breakpoint 230 to the breakpoint 232 on the ruler 228, the electronic canvas 238 and the objects within the electronic canvas 238 may adjust according to the states of the electronic canvas 238 as the electronic canvas 238 is being resized. For example, the arrangement of objects, colors of objects, fonts for text, and the like, may be displayed in a different manner for the electronic canvas 238 in the depicted state than in the state of the electronic canvas 218 depicted in FIG. 2(*a*). FIG. 2(*b*) depicts an electronic canvas 238 having a width from the boundary 234, which is aligned to the zero pixel width location, to the boundary 236, which is aligned to the pixel width location indicated by the breakpoint 232. Additionally, FIG. 2(*b*) depicts the tool bar 222, the grid tool bar 224, and the properties tool bar 226 similar to those shown in FIG. 2(*a*).

The example user interface 240 of FIG. 2(*c*) depicts the electronic document 259 with an electronic canvas 258 that has been expanded such that the boundary 256 of the electronic canvas 258 is located between the breakpoint 252 and the edge of the electronic document 259, which may also be a breakpoint indicating a particular pixel width of a display area. When the electronic canvas 258 is expanded from the breakpoint 252 on the ruler 248 to the pixel width location of the boundary 256, the electronic canvas 258 and the objects within the electronic canvas 258 may adjust according to the states of the electronic canvas 258 as the electronic canvas 258 is being resized. For example, the arrangement of objects, colors of objects, fonts for text, and the like, may be displayed in a different manner for the electronic canvas 258 in the depicted state than in the state of the electronic canvas 238 depicted in FIG. 2(*b*). FIG. 2(*c*) depicts an electronic canvas 258 having a width from the boundary 254, which is aligned to the zero pixel width location, to the boundary 256. Additionally, FIG. 2(*c*) depicts the tool bar 242, the grid tool bar 244, and the properties tool bar 246 similar to those shown in FIG. 2(*a*) and FIG. 2(*b*).

The example user interface 260 of FIG. 2(*d*) depicts the electronic canvas 278 that has been expanded such that the boundary 276 of the electronic canvas 278 is located at the edge of the electronic document, which may also be a breakpoint indicating a particular pixel width of a display area. When the electronic canvas 278 is expanded from the breakpoint 272 on the ruler 268 to the pixel width location of the boundary 276, the electronic canvas 278 and the objects within the electronic canvas 278 may adjust according to the states of the electronic canvas 278 as the electronic canvas 278 is being resized, including the intermediate state depicted by the electronic canvas 258 of FIG. 2(*c*). For example, the arrangement of objects, colors of objects, fonts for text, and the like, may be displayed in a different manner for the electronic canvas 278 in the depicted state than in the state of the electronic canvas 258 depicted in FIG. 2(*c*), FIG. 2(*d*) depicts an electronic canvas 278 having a width from the boundary 274, which is aligned to the zero pixel width location, to the boundary 276. Additionally, FIG. 2(d) depicts the tool bar 262, the grid tool bar 264, and the properties tool bar 266 similar to those shown in FIG. 2(a), FIG. 2(b), and FIG. 2(c).

Figure 3:
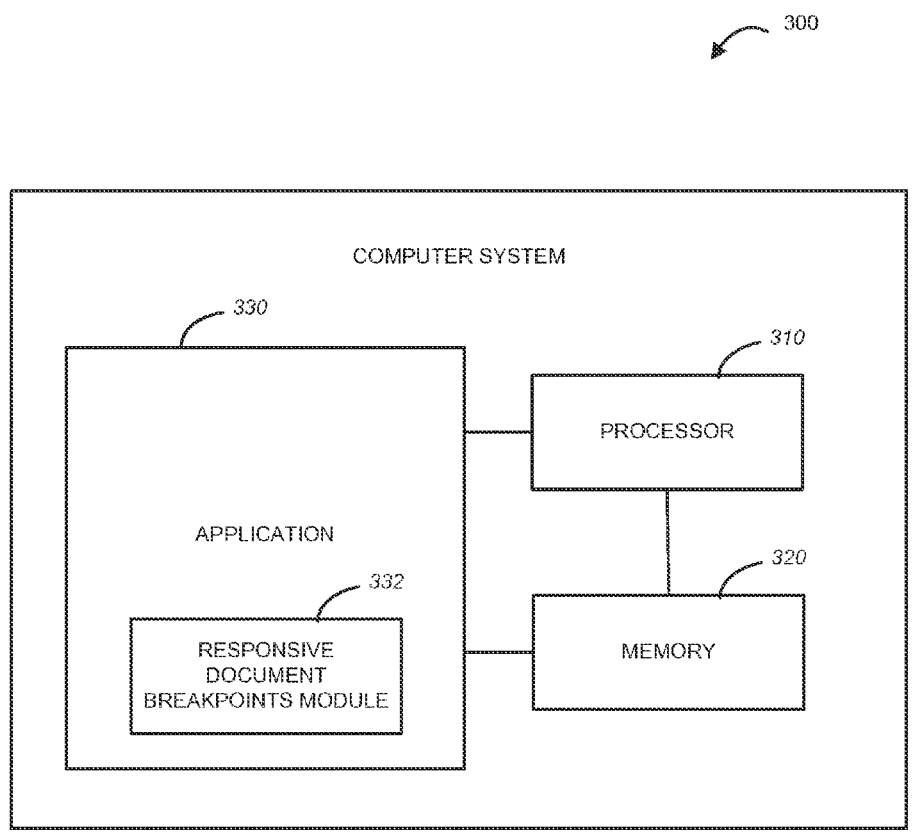
FIG. 3 is a block diagram showing an example system architecture within which a responsive document breakpoints system and method is implemented, in accordance with an example embodiment.

FIG. 3 is a block diagram showing an example system architecture within which a responsive document breakpoints system and method is implemented. The computer system 300 comprises one or more processors including one or more processors 310 coupled to a memory 320 and an application 330. The application 330 may be any software application providing a user the ability to create, design, and edit a webpage and may include a responsive document breakpoints module 332. The responsive document breakpoints module 332 may be implemented as a module that is part of the application 330 or as a plug-in that can be utilized with the application 330. The responsive document breakpoints module 332, in one example embodiment, may be configured to allow a user to design a webpage for multiple display devices on a document.

Figure 4:
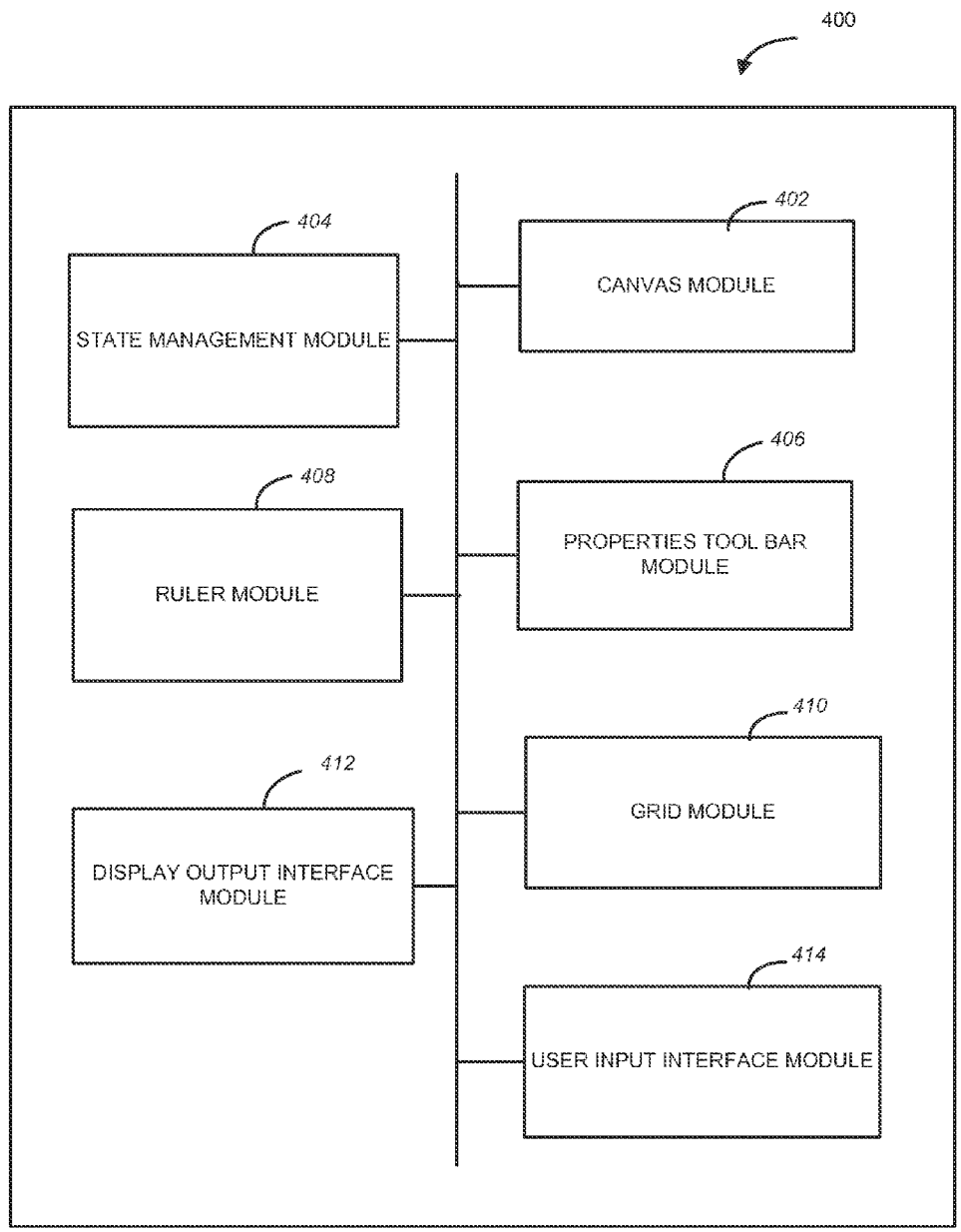
FIG. 4 is a block diagram showing example components of a responsive document breakpoints system, in accordance with an example embodiment.

FIG. 4 is a block diagram showing example components of a responsive document breakpoints system 400. In one example embodiment, the system 400 for providing responsive document breakpoints may be associated with an application and may correspond to the responsive document breakpoints module 332 of FIG. 3. Each of the modules of the system 400 may be implemented utilizing at least one processor.

As shown in FIG. 4, the system 400 includes a canvas module 402, a state management module 404, a properties tool bar module 406, a ruler module 408, a grid module 410, a display output interface module 412, and a user input interface module 414.

The canvas module 402 may be a hardware-implemented module which may manage and control the display of the electronic canvas, including how the electronic canvas is resized and displayed.

The state management module 404 may be a hardware-implemented module which may manage and control the state associated with the electronic canvas at various canvas sizes. The state management module 404 may manage and control the manner in which the electronic canvas and the objects within the electronic canvas are displayed based on the particular state of the electronic canvas, including managing and controlling the properties or characteristics associated with the objects on the electronic canvas in any particular state.

The properties tool bar module 406 may be a hardware-implemented module which may manage and control a properties tool bar on the application, such as the properties tool bar 206 of FIG. 2(a). The properties tool bar module 406 may manage and control tool bar functions such as indicating particular colors, fonts, text sizes, and the like for the electronic canvas in various states.

The ruler module 408 may be a hardware-implemented module which may manage and control any pixel width alignments, including pixel widths indicated by breakpoints. The ruler module 408 may manage and control the display of breakpoints, the setting of breakpoints by a user, and any automatic alignments of the electronic canvas to a breakpoint.

The grid module 410 may be a hardware-implemented module which may manage and control a grid tool bar on the application, such as the grid tool bar 204 of FIG. 2(a). The grid module 410 may manage and control tool bar functions such as turning the grid on or off, adjusting a grid to a particular location or spacing, changing functionalities of the grid, such as the ability to snap objects or the electronic canvas to a line of the grid, and the like.

The display output interface module 412 may be a hardware-implemented module which may control information or data that is provided to a client device of a user for display on the client device. For example, the display output interface module 412 may be configured to provide display data associated with displaying the electronic canvas of the electronic document via the application.

The user input interface module 414 may be a hardware-implemented module which may receive user inputs relating to the design of a webpage layout from a client device of a user. For example, the user input interface module 414 may receive inputs indicating functions, such as a request to resize the electronic canvas, a request to place an object in a particular location, a request to change the manner in which objects may be displayed when the electronic canvas is in a particular state, and the like.

Figure 5:
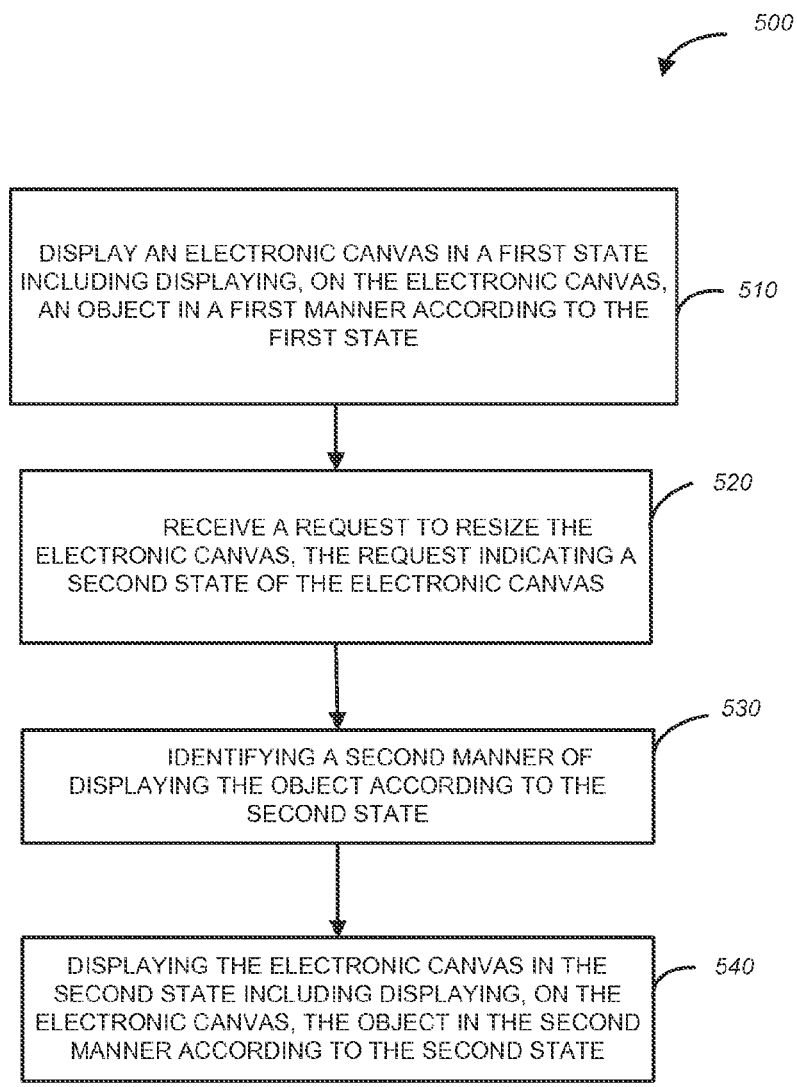
FIG. 5 is a flowchart showing an example method of providing responsive document breakpoints, in accordance with an example embodiment.

FIG. 5 is a flowchart showing an example method 500 of providing responsive document breakpoints. In operation 510, the display output interface module 412 (of FIG. 4) may display an electronic canvas in a first state. The first state may include the manner in which the electronic canvas is displayed when the electronic canvas is associated with a particular display size. The display of the electronic canvas may include displaying, on the electronic canvas, an object in a first manner according to the first state. The first state may include how objects on the electronic canvas are to be displayed. For example, the electronic canvas may be displayed with an object that has a particular color, font, location, size, animation, behavior, property, and the like, when the electronic canvas is in the first state.

In operation 520, the user input interface module 414 may receive a request to resize the electronic canvas. The request may indicate a second state of the electronic canvas. For example, the request may be a user input indicating the electronic canvas should be resized from a first breakpoint to a second breakpoint, such that when the electronic canvas is resized to a pixel width indicated by the second breakpoint, the electronic canvas may be in a particular state associated with that particular size.

In operation 530, the state management module 404 may identify a second manner of displaying the object according to the second state. The state management module 404 may be able to identify the manner in which objects should be displayed on the electronic canvas when the electronic canvas is in the second state.

In operation 540, the display output interface module 412 may display the electronic canvas in the second state using the identified manner in which the objects should be displayed in the second state. The display of the electronic canvas may include displaying, on the electronic canvas, the object in the second manner according to the second state.

Figure 6:
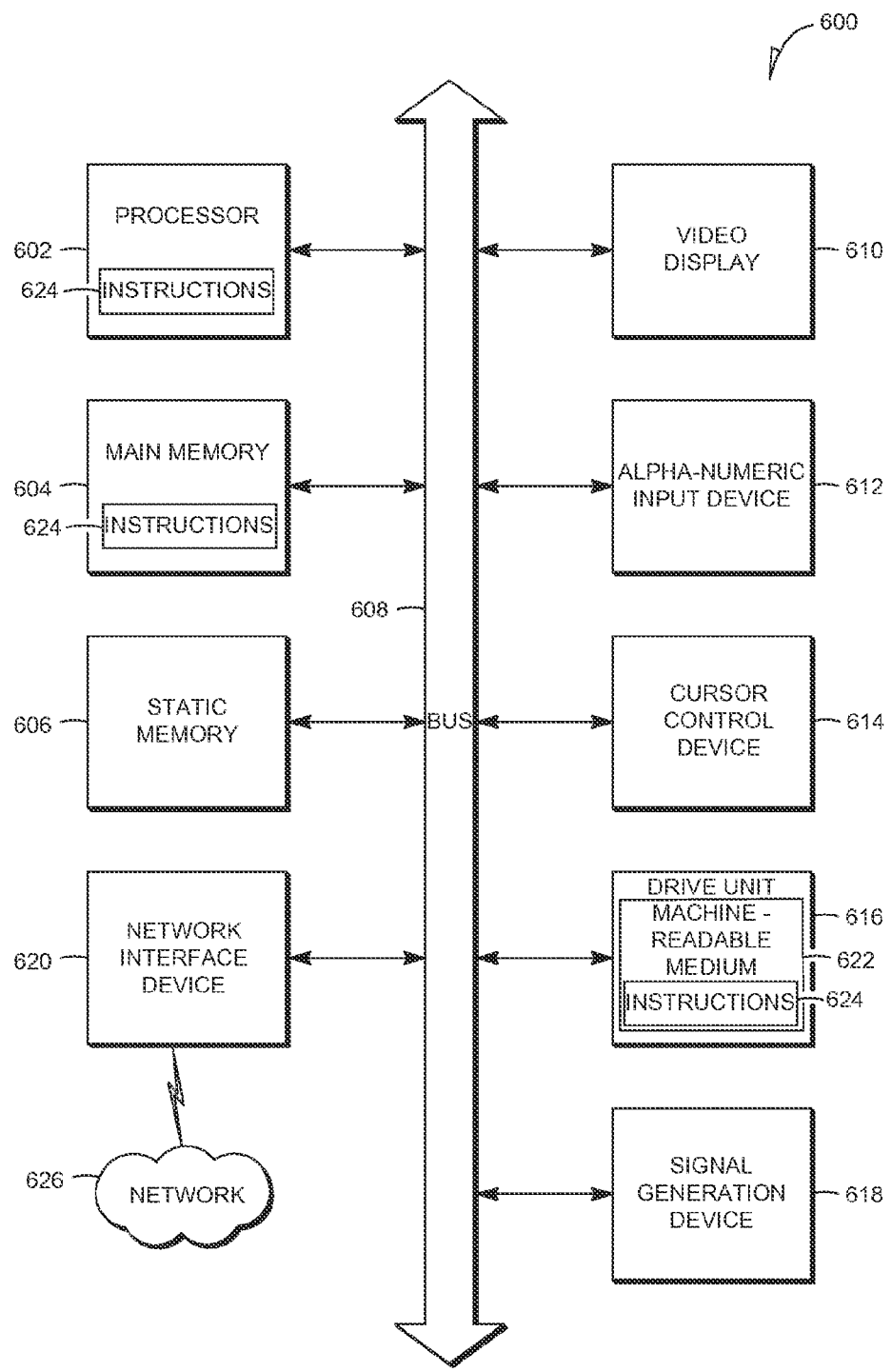
FIG. 6 is a diagrammatic representation of a machine in the example form of a computer system within which a set of instructions may be executed to cause the machine to perform any one or more of the methodologies illustrated in accordance with FIGS. 1-5 related to responsive document breakpoints.

FIG. 6 is a diagrammatic representation of a machine in the example form of a computer system 600 within which may be executed a set of instructions for causing the machine to perform any one or more of the methodologies related to responsive document breakpoints. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a non-transitory machine-readable storage medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media.

The instructions 624 may further be transmitted or received over a network 626 via the network interface device 620 utilizing any one of a number of well-known transfer protocols (e.g., Hyper Text Transfer Protocol (HTTP)).

While the non-transitory machine-readable storage medium 622 is shown in an example embodiment to be a single medium, the term "machine-readable storage medium" should be taken to include a single medium or multiple media (e.g., a centralized or distributed database, and/or associated caches and servers) that store the one or more sets of instructions 624. The term "machine-readable storage medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable storage medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, methods and systems for providing responsive document breakpoints have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

What is claimed is:

1. A computer-implemented method for displaying an object on an electronic canvas according to a state of an electronic canvas, the method comprising:
   displaying the electronic canvas in a first state including displaying, on the electronic canvas, the object, the electronic canvas having a set of breakpoints associated therewith, each breakpoint indicating a location on the electronic canvas and corresponding to a particular display state for the electronic canvas and manner for displaying the object, the first state associated with a first breakpoint, and the object displayed in a first manner according to the first state based on the first breakpoint;
   receiving a request to resize the electronic canvas, the request indicating a second state of the electronic canvas;
   identifying a second manner of displaying the object according to the second state based on a second breakpoint associated with the second state; and
   displaying the electronic canvas in the second state including displaying, on the electronic canvas, the object in the second manner according to the second state.

2. The method of claim 1, wherein receiving the request to resize the electronic canvas includes receiving the request to resize the electronic canvas from the first breakpoint associated with the first state to the second breakpoint associated with the second state, the first breakpoint indicating a first display size and the second breakpoint indicating a second display size.

3. The method of claim 2, further comprising:
   displaying a resizing of the electronic canvas from the first breakpoint to the second breakpoint including displaying the electronic canvas in an intermediate state during the resizing and displaying, on the electronic canvas, the object in an intermediate manner according to the intermediate state during the resizing, the electronic canvas in the intermediate state having a boundary between the first breakpoint and the second breakpoint.

4. The method of claim 1 wherein the set of breakpoints comprises at least three breakpoints, and further comprising:
   receiving a second request to resize the electronic canvas, the request indicating a third state of the electronic canvas;
   identifying a third manner of displaying the object according to the third state based on a third breakpoint associated with the third state; and
   displaying the electronic canvas in the third state including displaying, on the electronic canvas, the object in the third manner according to the third state.

5. The method of claim 1, further comprising:
   determining a gridline associated with a second position; and
   automatically aligning the object on the electronic canvas in the first state according to the gridline associated with the second position.

6. The method of claim 1, wherein displaying the object in the first manner includes displaying the object in a first position relative to other objects on the electronic canvas in the first state and wherein displaying the object in the second manner includes displaying the object in a second position relative to the other objects on the electronic canvas in the second state, the first position being different than the second position.

7. The method of claim 1, wherein displaying the object in the first manner includes displaying the object having a first size and wherein displaying the object in the second manner includes displaying the object having a second size, the first size of the object being different than the second size of the object.

8. A computer-implemented system for displaying an object on an electronic canvas according to a state of the canvas comprising:
   a hardware-implemented display module configured to display the electronic canvas in a first state and further configured to display, on the electronic canvas, the object, the electronic canvas having a set of breakpoints associated therewith, each breakpoint indicating a location on the electronic canvas and corresponding to a particular display state for the electronic canvas and manner for displaying the object, the first state associated with a first breakpoint, and the object displayed in a first manner according to the first state based on the first breakpoint;
   a hardware-implemented user input module configured to receive a request to resize the electronic canvas, the request indicating a second state of the electronic canvas; and
   a hardware-implemented state management module configured to identify a second manner of displaying the object according to the second state,
   wherein the hardware-implemented display module is further configured to display the electronic canvas in the second state and further configured to display, on the electronic canvas, the object in the second manner according to the second state based on a second breakpoint associated with the second state.

9. The computer-implemented system of claim 8, wherein the request to resize the electronic canvas includes a request to resize the electronic canvas from the first breakpoint associated with the first state to the second breakpoint associated with the second state, the first breakpoint indicating a first display size and the second breakpoint indicating a second display size.

10. The computer-implemented system of claim 9, wherein the hardware-implemented display module is further configured to display a resizing of the electronic canvas from the first breakpoint to the second breakpoint, the resizing including displaying the electronic canvas in an intermediate state and displaying, on the electronic canvas, the object in an intermediate manner according to the intermediate state, the electronic canvas in the intermediate state having a boundary between the first breakpoint and the second breakpoint.

11. The computer-implemented system of claim 9, further comprising:
a hardware-implemented canvas module configured to automatically align a boundary of the electronic canvas with the second breakpoint in response to the request to resize the electronic canvas.

12. The computer-implemented system of claim 8, further comprising:
a hardware-implemented gridline module configured to determine a gridline associated with a second position in response to a request to move the object on the electronic canvas in the first state from a first position to the second position, wherein the hardware-implemented gridline module is further configured to automatically align the object on the electronic canvas in the first state according to the gridline associated with the second position.

13. The computer-implemented system of claim 8, wherein the hardware-implemented display module is further configured to display the object in a first position relative to other objects on the electronic canvas in the first state and further configured to display the object in a second position relative to the other objects on the electronic canvas in the second state, the first position being different than the second position.

14. The computer-implemented system of claim 8, wherein the hardware-implemented display module is further configured to display the object having a first size in the first manner and further configured to display the object having a second size in the second manner, the first size of the object being different than the second size of the object.

15. A non-transitory machine-readable storage medium having instructions which, when executed by one or more processors, cause the one or more processors to perform operations comprising:
displaying an electronic canvas in a first state including displaying, on the electronic canvas, an object, the electronic canvas having a set of breakpoints associated therewith, each breakpoint indicating a location on the electronic canvas and corresponding to a particular display state for the electronic canvas and manner for displaying the object, the first state associated with a first breakpoint, and the object displayed in a first manner according to the first state based on the first breakpoint;
receiving a request to resize the electronic canvas, the request indicating a second state of the electronic canvas;
identifying a second manner of displaying the object according to the second state; and
displaying the electronic canvas in the second state including displaying, on the electronic canvas, the object in the second manner according to the second state based on a second breakpoint associated with the second state,
wherein the first state corresponds to a first display size and the second state corresponds to a second display size.

16. The non-transitory machine-readable storage medium of claim 15, wherein receiving the request to resize the electronic canvas includes receiving the request to resize the electronic canvas from the first breakpoint associated with the first state to the second breakpoint associated with the second state, the first breakpoint indicating the first display size and the second breakpoint indicating the second display size.

17. The non-transitory machine-readable storage medium of claim 16, wherein the instructions cause the one or more processors to perform further operations comprising:
displaying a resizing of the electronic canvas from the first breakpoint to the second breakpoint including displaying the electronic canvas in an intermediate state during the resizing and displaying, on the electronic canvas, the object in an intermediate manner according to the intermediate state during the resizing, the electronic canvas in the intermediate state having a boundary between the first breakpoint and the second breakpoint.

18. The non-transitory machine-readable storage medium of claim 15, wherein displaying the object in the first manner includes displaying the object in a first position relative to other objects on the electronic canvas in the first state and wherein displaying the object in the second manner includes displaying the object in a second position relative to the other objects on the electronic canvas in the second state, the first position being different than the second position.

19. The non-transitory machine-readable storage medium of claim 15, wherein displaying the object in the first manner includes displaying the object having a first size and wherein displaying the object in the second manner includes displaying the object having a second size, the first size of the object being different than the second size of the object.

20. The method of claim 1, wherein the object comprises an image, text, video, or document, and wherein the set of breakpoints are determined based on input from a designer associated with the object.

\* \* \* \* \*